UNITED STATES PATENT OFFICE.

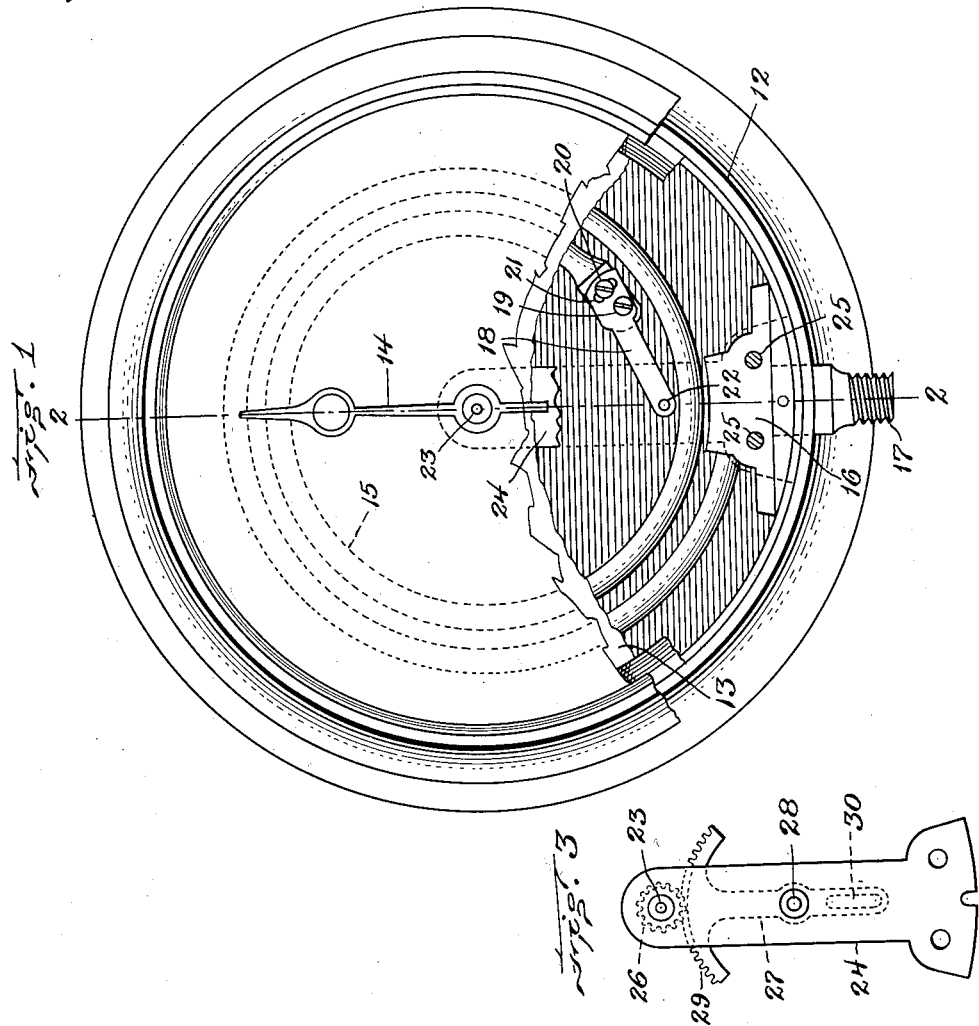
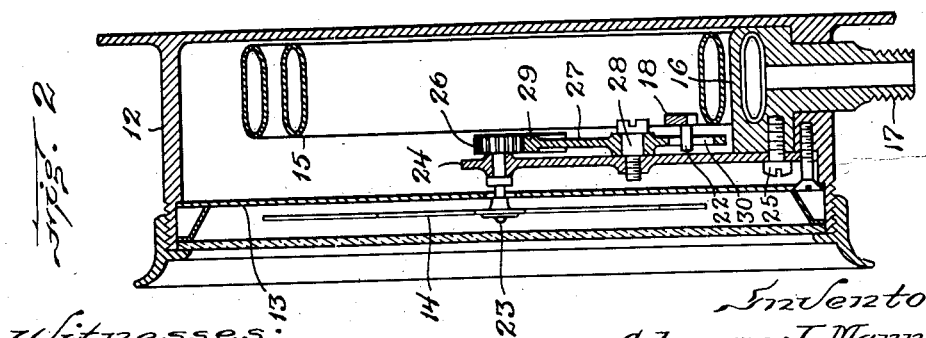

COLEMAN J. MANNING, OF MEDFORD, MASSACHUSETTS, ASSIGNOR TO AMERICAN STEAM GAUGE AND VALVE MANUFACTURING COMPANY, OF BOSTON, MASSACHUSETTS, A CORPORATION OF NEW JERSEY.

PRESSURE-GAGE.

957,471.   Specification of Letters Patent.   Patented May 10, 1910.

Application filed January 26, 1909. Serial No. 474,236.

*To all whom it may concern:*

Be it known that I, COLEMAN J. MANNING, of Medford, in the county of Middlesex and State of Massachusetts, have invented certain new and useful Improvements in Pressure-Gages, of which the following is a specification.

This invention relates to a pressure gage employing a tubular spring or Bourdon tube of curved form, one end of the tube being fixed and communicating with a source of steam or other pressure, while the opposite end of the tube is free, and is adapted to be moved laterally outward by an increase of pressure tending to straighten the tube, and to be moved laterally inward by the resilience of the tube when the pressure decreases.

The invention has for its object to simplify the construction and increase the durability of a gage of this character, particularly as regards the mechanism which imparts rotary movement from the free end of the tube to a shaft journaled in the casing of the gage and carrying a pointer which is caused to move over the dial of the gage by expanding and contracting movements of the tube.

The invention consists in the improvements which I will now proceed to describe and claim.

Of the accompanying drawings, forming a part of this specification,—Figure 1 represents a front elevation of a pressure gage embodying my invention, a portion of the dial being removed. Fig. 2 represents a section on line 2—2 of Fig. 1. Fig. 3 represents a side view of the bracket which supports the pointer shaft, and the mechanism supported by said bracket for imparting motion from the Bourdon tube to the pointer.

The same reference characters indicate the same parts in all the figures.

In the drawings, 12 represents the casing of the gage, which is preferably of circular form, and is provided with a suitable dial 13 over which a pointer 14 is movable by movements of the Bourdon tube imparted through connecting mechanism to the shaft of the pointer, as hereinafter described.

15 represents the Bourdon tube, the inner end of which is affixed to a chambered socket 16 attached to the casing 12, and receives pressure from steam admitted to said socket through an inlet fitting 17. The tube 15 is elongated and bent to form a spiral which preferably has the number of convolutions shown in Fig. 1, the tube being of much greater length than the ordinary Bourdon tube, which is formed into a single loop, and does not have a spiral formation.

18 represents an arm positively secured by screws 19 and 20 to a flattened ear formed on the free end of the tube 15, the screw 20 passing through a segmental slot 21 in the arm 18. Said screw 20 and slot 21 permit the arm to be adjusted by swinging it on the screw 19, when the screw 20 is loosened, to vary the radial distance between a pin 22 affixed to the outer end of the arm 18, and the shaft or arbor 23 which carries the pointer 14.

24 represents a bracket which is affixed by screws 25 to the socket 16, and overhangs the central portion of the space surrounded by the Bourdon tube 15. The pointer shaft 23 is journaled in a bearing in the outer end of the bracket 24, and is provided with a pinion 26 located at the under side of the bracket.

27 represents a lever which is pivoted at 28 to the bracket 24, and has at the outer end of one of its arms a segmental rack 29 meshing with the pinion 26. In the other arm of the lever 27 is a longitudinal slot 30 which receives the stud 22 on the arm 18.

The free end of the Bourdon tube 15 is moved outwardly from the center of the casing by an increase of pressure, and is moved inwardly by the resilience of the tube when the pressure decreases. The elongation and spiral formation of the tube causes a much greater amplitude of movement of its free end than would occur if the tube had but one loop, as usual. The movements of the free end of the tube are imparted by the arm 18 to the lever 27 which is oscillated on its pivot 28, and imparts through the segmental rack 29 and pinion 26 rotary movements to the pointer shaft 20, the pointer being thus moved over the dial. The amplitude of movement of the free end of the tube 15 enables all the required movements to be imparted to the pointer 14 by the simple mechanism above described, said mechanism including the arm 18, the lever 27 with its rack segment 29, and the pinion 26.

The lever 27 is oscillated through a sufficiently wide arc to enable its teeth to be made relatively few in number and therefore correspondingly heavy and durable, the number of teeth on the segment 29 required to cause a complete rotation of the pointer shaft being much smaller than would be required if the Bourdon tube were of ordinary length. The teeth of the pinion 26 are of course correspondingly large and durable, so that the engagement of the teeth of the pinion and segmental rack is not attended with objectionably rapid wear of said teeth.

The improved gage above described is intended particularly for traction engines, the operation of which is attended with considerable jar and vibration. Ordinarily, pressure gages used on engines of this character have been short-lived, so far as the mechanism for communicating motion from the Bourdon tube to the pointer is concerned, owing to the fact that the tube is usually composed of a single loop, so that the movements of its free end are relatively short. It has, therefore, been necessary to provide motion multiplying mechanism between the free end of the spring and the lever carrying the rack segment engaging the pinion on the pointer shaft. It has also been necessary to provide a relatively larger number of teeth on the rack segment, and to make the teeth correspondingly small in order that a sufficient number may be formed in a segment of the greatest length practicable. It has been found, therefore, that pressure gages applied to traction engines have occasioned more or less trouble, owing to the rapid wear of the gear teeth and of the joints of the motion multiplying mechanism through which motion is communicated from the free end of the spring to the lever carrying the rack segment. These objections are obviated by the improvements above described, the amplitude of movement of the free end of the spring enabling the motion communicating mechanism to be reduced to the smallest number of parts, and the gear teeth to be made relatively heavy and durable.

I claim:

In a pressure gage, the combination of a casing having a steam inlet, a Bourdon tube, the inner end of which is affixed to the casing and communicates with said inlet, the tube being of spiral form, whereby its free end is given a maximum amplitude of movement, a fixed support overhanging the central portion of the space surrounded by said tube, and provided with an enlargement forming a bearing, a pointer-carrying arbor journaled in said bearing and provided with a pinion, said bearing serving as the sole support for said arbor, a fulcrum screw also secured to said support at a point located perpendicularly below said bearing, a two-armed lever mounted on said fulcrum screw and having on one arm a segmental rack engaging said pinion, the other arm of said lever having a longitudinal slot, an arm pivotally connected to the free end of the spiral tube and having a stud projecting into the slot of said lever, and means for preventing pivotal movement of said arm.

In testimony whereof I have affixed my signature, in presence of two witnesses.

COLEMAN J. MANNING.

Witnesses:
C. F. BROWN,
P. W. PEZZETTI.